United States Patent [19]

Jacquel

[11] Patent Number: 4,881,219
[45] Date of Patent: Nov. 14, 1989

[54] CONTROL DEVICE FOR A SUNSHADE BLIND RESPONSIVE TO METEOROLOGICAL PHENOMENON

[75] Inventor: Dominique Jacquel, Marnaz, France
[73] Assignee: Somfy, France
[21] Appl. No.: 595,343
[22] Filed: Mar. 30, 1984
[30] Foreign Application Priority Data
  Apr. 25, 1983 [FR] France .................. 8306754
[51] Int. Cl.$^4$ .................................. F24J 3/02
[52] U.S. Cl. ........................ 364/400; 364/144; 364/420; 126/425; 126/419
[58] Field of Search ............... 364/400, 418, 420, 144, 364/146; 126/418, 419, 424, 425

[56] References Cited

U.S. PATENT DOCUMENTS

| | | | |
|---|---|---|---|
| 3,450,192 | 6/1969 | Hay | 126/428 |
| 4,079,597 | 3/1978 | Lindner | 310/67 R |
| 4,219,008 | 8/1980 | Schultz | 126/422 |
| 4,305,122 | 12/1981 | Smith et al. | 364/144 |
| 4,308,911 | 1/1982 | Mandl | 340/588 |
| 4,354,484 | 10/1982 | Malone et al. | 126/425 |
| 4,365,615 | 12/1982 | Melvin | 126/419 |

*Primary Examiner*—John R. Lastova
*Attorney, Agent, or Firm*—Kane, Dalsimer, Sullivan, Kurucz, Levy, Eisele and Richard

[57] ABSTRACT

The present invention relates to an automatic device for controlling a blind or a smaller device for protection against the sun.

This device comprises an electronic comparator 3, whereof a first input E+ is connected to a pick-up 1 provided for measuring the intensity of a meteorological phenomenon, whereof a second input E− is connected to a device 4 for regulating a predetermined threshold of said intensity and whereof the output S2 is connected to control means. These control means are provided in order to control the initiation of the elapse of a first predetermined delya period T1, and illuminating a luminous indicator 9, at the instant when the intensity exceeds the predetermined threshold, then controlling the operation of the blind in a first direction at the end of this first period T1. If the first delay period T1 is terminated, they are also provided for controlling the initiation of the elapse of a second predetermined delay period T2, at the instant when the intensity drops below the predetermined threshold, then controlling the operation of the blind in the second direction at the end of this second period T2. The luminous indicator 9 is connected to means for controlling the flashing, provided so that at the instant when the intensity of the meteorological phenomenon drops below the predetermined threshold, solely in the case where the first delay period T1 has previously reached its end, they control an oscillating system operating at a certain frequency, provided for causing the luminous indicator to flash at the said frequency, at least until the end of the second predetermined delay period T2.

3 Claims, 3 Drawing Sheets

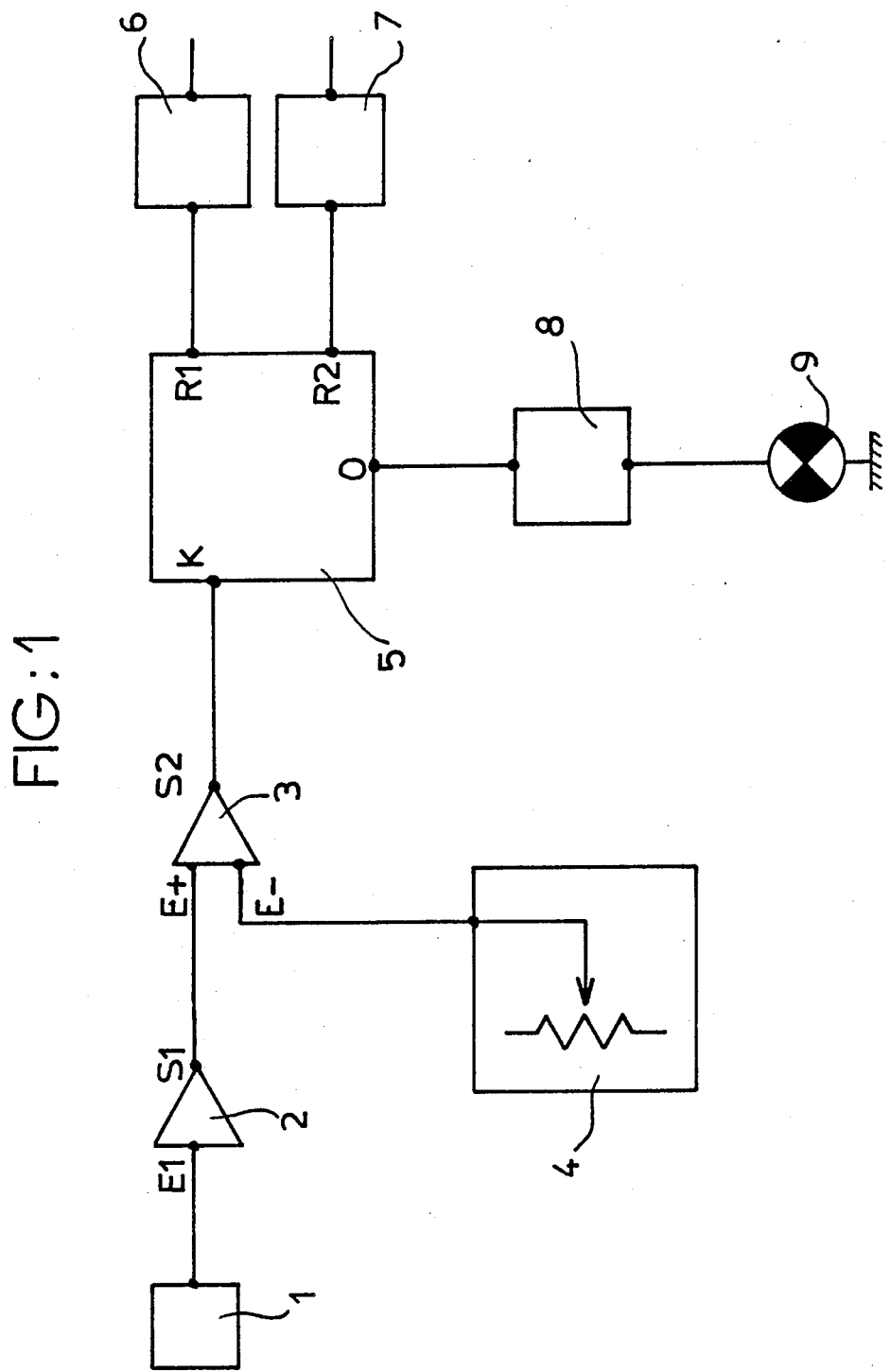
FIG:1

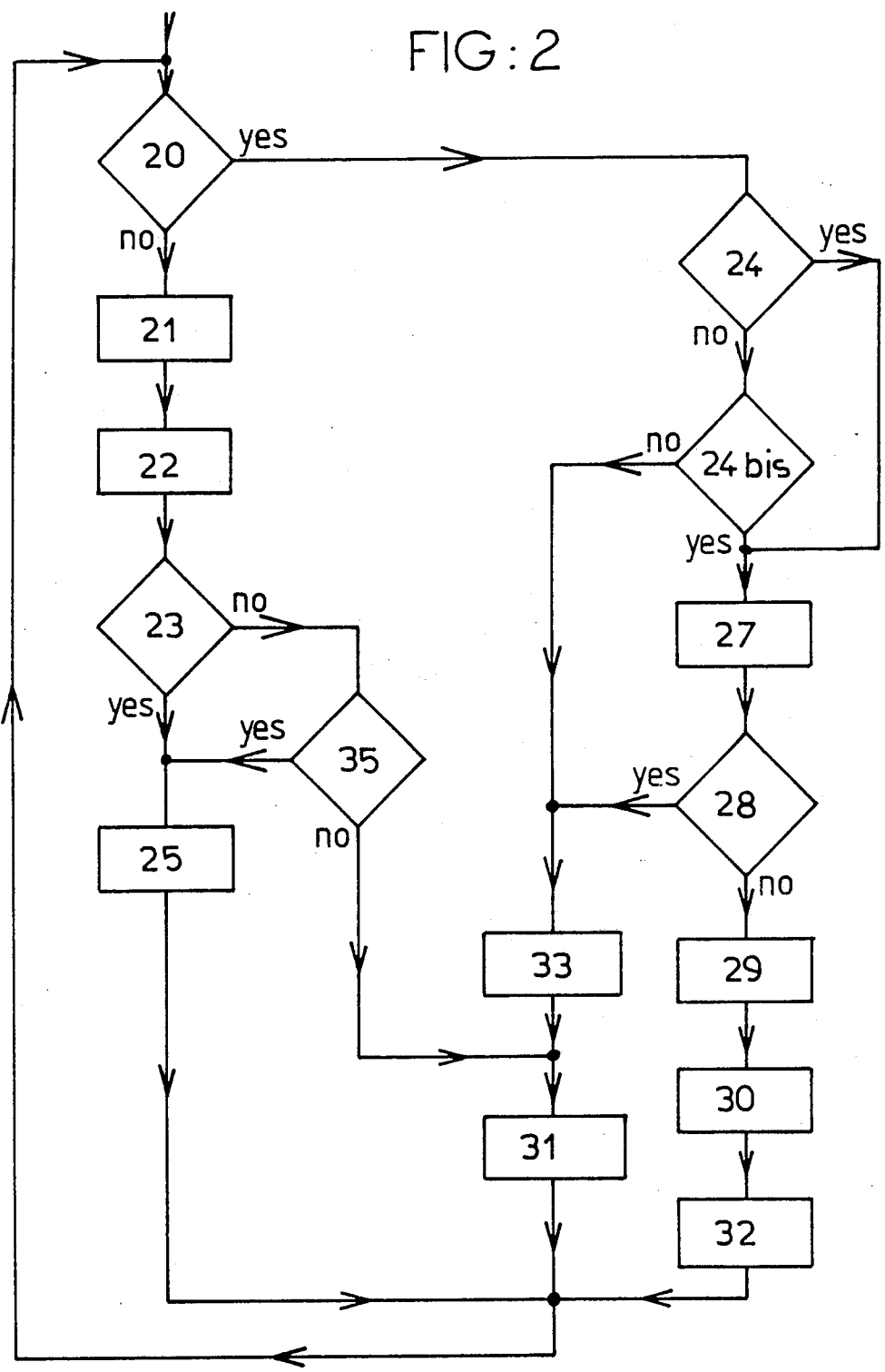
FIG:2

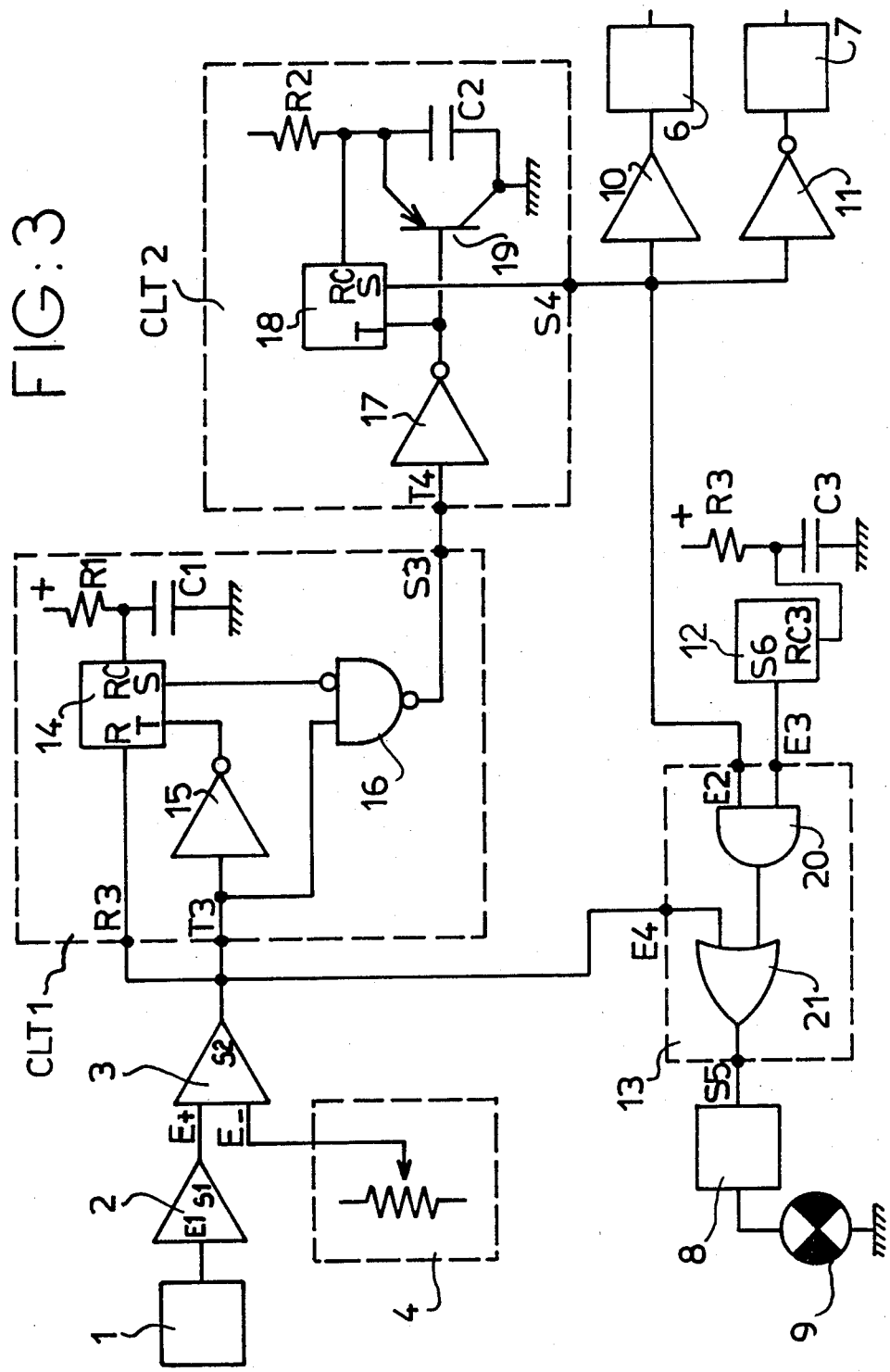
FIG:3

CONTROL DEVICE FOR A SUNSHADE BLIND RESPONSIVE TO METEOROLOGICAL PHENOMENON

BACKGROUND OF THE INVENTION

The present invention relates to automatic control devices, provided for controlling a blind or similar device giving protection from the sun, in either of its two operating directions: unrolling and rolling up. These devices comprise an electronic comparator whereof one input is connected to a pick-up provided for measuring the intensity of a metheorological phenomenon such as: wind speed, temperature, brightness of the sun and so on, whereof a second input is connected to a device for regulating a predetermined threshold of said intensity and whereof the output is connected to control means. These control means are provided for controlling the initiation of the elapse of a first predetermined delay period and for illuminating a luminous indicator, at the instant when the intensity of the meteorological phenomenon equals or exceeds the predetermined threshold, then for controlling the operation of the blind in a first direction at the end of this first delay period. If the first delay period is terminated, they are also provided for controlling the initiation of the elapse of a second predetermined delay period, at the instant when the intensity once more drops below the predetermined threshold, then controlling the operation of the blind in a second direction, at the end of this second delay period. The function of the first and second selay periods, which have a duration of one to ten minutes for example, is to prevent excessively close, successive changes of the direction of operation of the blind, in the case where the intensity of the metheorological phenomenon oscillrates rapidly around the predetermined threshold.

In known automatic control devices of this type, the luminous indicator, which is connected directly to the output of the electronic comparator, has an operation which is linked directly and solely with the existing level of intensity of the meteorological phenomenon, with respect to the predetermined regulating threshold of this intensity. As long as this intensity is equal to or greater than this threshold, the luminous indicator is illuminated and as soon as the intensity drops below the threshold, the luminous indicator is extinguished. It follows that throughout the entire duration of the second delay period, which precedes the control of the operation of the blind in its second direction, an observer cannot know if the second delay period is in progress and if the command controlling the blind in the second direction will be given shortly, or the automatic control device is broken-down. Hitherto, the only means of knowing this consists of waiting for the end of a period at the most equal to the second delay period and of ascertaining if the blind is then effectively actuated in its second direction. The problem occures for example when the intensity detected is the intensity of the brightness of the sun. If, at a given instant, the observer ascertains that the blind is unrolled and that there is no sun, he may assume that the installation is broken-down.

SUMMARY OF THE INVENTION

The automatic control device according to the invention is characterised in that the luminous indicator is connected to flashing means which are provided in order that, at the instant when the intensity of the metheorological phenomenon becomes less than the predetermined threshold, solely in the case where the first delay period has previously reached its end, they control an oscillating system operating at a certain frequency, provided in order to make the luminous indicator flash at the said frequency, at least until the end of the second predetermined delay period.

The present invention may be used for example in the case where the control means are consitituted by a microprocessor containing a succession of programs in its non-volatile memory (ROM). The automatic control device is characterised in that the succession of programs comprises in particular a program for testing the existence of an intensity less than the predetermined threshold, followed by a program for testing if the end of the elapse of the first predetermined delay period, itself followed by a program provided for testing if the second predetermined delay period is terminated. The automatic control device is also characterised in that it comprises means for controlling the flashing of the luminous indicator, constituted by a sub-programme for the alternate changing of the binary value of a position of the volatile memory (RAM) of the microprocessor, at a certain frequency, provided for being controlled by the last instruction of the program provided for testing if the second predetermined delay period is terminated, solely in the case where a negative response has been given to the test of this last program and where a positive response has been given to the tests of the two preceding programmes. This sub-program for alternate changing of the binary value is followed by a sub-programme for the transfer of this binary value to the luminous indicator, in order to make the latter flash at the said frequency.

The present invention may also be used for example in the case where the control means are constituted by a first and second logic delay circuit, the second circuit being provided in order to control the initiation of the elapse of the second predetermined delay period, at the instant when the intensity becomes less than the predetermined threshold, solely if the first predetermined delay period, initiated by the first circuit, has reached its end previously. In this case, the automatic control device is characterised in that it comprises means for controlling the flashing of the luminous indicator, constituted by a logic control circuit whereof a first input is connected to the output of the electronic comparator, whereof a second input is connected to the output of the second logic delay circuit, whereof a third input is connected to an oscillator providing the flashing frequency and whereof the output is connected to the luminous indicator. This logic control circuit is provided for allowing the oscillator to make the luminous indicator flash, solely when the logic state of the output of the electronic comparator corresponds to an intensity which is once more less than the predetermined threshold and when simultaneously the state of the output of the second logic delay circuit corresponds to the initiation of the elapse of the second delay period.

The present invention proposes to facilitate the production of an improved automatic control device which, without it being necessary to use additional indicators or display systems, is able to indicate to an observer that the said control device is operating correctly, during the elapse of the second delay period which precedes the control of the second operating direction of the blind.

BRIEF DESCRIPTION OF THE DRAWINGS

The accompanying drawings illustrate, by way of example, embodiments of the control device according to the present invention.

FIG. 1 shows the wiring diagram of a first embodiment of the invention.

FIG. 2 shows the flow chart of the program contained in the non-volatile memory of the microcalculator constituting the control means, in the same first embodiment.

FIG. 3 shows the wiring diagram of a second embodiment of the invention.

DETAILED DESCRIPTION OF THE INVENTION

As illustrated in FIG. 1, the automatic control device comprises a sensor 1 provided for measuring the intensity of the sun's brightness. The output of the sensor 1 is connected to the input E1 of an electronic processing circuit 2 whereof the output S1 is connected to the non-inverting input E+ of an electronic comparator 3. The circuit 2 is intended to render the electrical information given by the sensor 1, compatible with the comparison range of the electronic comparator 3. A device 4 for setting a predetermined threshold of the instensity of the sun's brightness, for example a potentiometer, has its output connected to the inverting input E— of the same electronic comparator 3.

The output S2 of the comparator 3 is connected to an input K of a microprocessor 5 (for example a TMS 1000 of TEXAS INSTRUMENTS) which constitutes the control means intended to control the rolling up or unrolling of a blind for protection against the sun for example. To this end, the output terminals R1 and R2 of this microprocessor 5 are connected respectively, through output interfaces 6,7, to the motor driving the blind, not shown in the drawing. The terminal R1 of the microprocessor 5 controls the first direction of rotation of the motor, corresponding for example to unrolling of the blind and the terminal R2 controls the second direction, corresponding to rolling up of the blind. The microprocessor 5 also comprises an output terminal O connected, through the intermediary of an interface 8, to a luminous indicator 9. The output interface 6,7 comprise for example amplifiers each controlling a relay, each relay controlling the rotation of the motor in one of the two directions. the interface 8 also comprises for example an amplifier.

The microprocessor 5 comprises a non-volatile memory ROM which in particular contains for example, as shown in FIG. 2, a program 20 for comparing the the sun's brightness, to the predetermined threshold, the last instruction of the program 20 is a conditional call instruction to the address of the first instruction of a program 24 provided for testing if the first delay period T1 is terminated, or to the address of the first instruction of a program 21 for controlling the permanent illumination of the luminous indicator 9. The last instruction of the program 21 precedes the first instruction of the program 22 for the delay T1. This program 22 is intended to initiate and then decrement a counter of the delay T1 provided in the microprocessor 5. The last instruction of program 22 precedes the first instruction of a program 23 provided for testing if the first delay period T1 is terminated, a program whereof the last instruction is a conditional call instruction to the address of the first instruction of a program 25 for controlling the first operating direction of the blind, i.e. its unrolling, or to the address of the first instruction of a program 35 provided for testing if the second delay period T2 was previously in progress.

The last instruction of program 35 is a conditional call instruction to the address of the first instruction of a program 31 for controlling the second operating direction of the blind, i.e. its rolling up, or to the address of the first instruction of program 25. The last instruction of program 31 precedes the first instruction of 20. The last instruction of program 25 precedes the first instruction of program 20.

The last instruction of program 24 provided for testing if the first delay period T1 is terminated, is a conditional call instruction to the address of the first instruction of a program 24b which tests if the second delay period T2 was previously in progress, or to the address of the first instruction of a program 27 for the delay T2. This program 27 is intended to preposition then decrement a counter for the delay T2 provided in the microprocessor 5. The last instruction of programme 24b is a conditional call instruction to the address of the first instruction of program 27 or to the address of the first instruction of a program 33 for controlling the extinguishing of the luminous indicator 9.

The last instruction of program 33 precedes the first instruction of program 31 for controlling the second operating direction of the blind. The last instruction of program 27 precedes the first instruction of a program 28 provided for testing if the second delay period T2 is terminated, a program whereof the last instruction is a conditional call instruction to the address of the first instruction of program 33 for controlling the extinguishing of the indicator 9, or to the address of the first instruction of a program 29 for controlling the first operating direction of the blind.

The last instruction of this program 29 precedes the first instruction of a subroutine 30 for alternate changing, at a certain frequency, of the binary value of a position of the volatile memory of the microprocessor 5. The last instruction of this subroutine 30 precedes the first instruction of a subroutine 32 for the transfer of this binary value to the luminous indicator 9. The combination of subroutine 30 and 32 constitutes an oscillating system operating at the frequency of alternate changing of the binary value defined above. The last instruction of this subroutine 32 precedes the first instruction of program 20.

Let us consider that the blind is, in the initial position, for example rolled up, stationary, the intensity of the sun's brightness being less than the predetermined threshold, for a certain period at least greater than the second predetermined delay period T2, its last operating direction having been the second direction, namely rolling up. Although the automatic control device is supplied with voltage, the luminous indicator 9 is extinguished, the intensity of the sun's brightness being less than the predetermined threshold, for a period greater than the second delay period T2.

As soon as the sensor 1 measures an intensity of the sun's brightness greater than the threshold of intensity predetermined by the regulating device 4, the output S2 of the electronic comparator 3 passes from logic state 0 to state 1, the program 20 tests the existence of this state and the program 21, 22, 23 are carried out sequentially, the indicator 9 being illuminated permanently and the delay period T1, provide to last one minute for example, being initialized and then counted down.

As soon as the program 23 tests that the first delay period T1 is not terminated, the 35 is implemented in order to test if the second delay period was previously in progress. Taking into account the initial position of the blind, at rest, as mentioned above, this program tests that the second delay period T2 was not in progress previously and the program 31 continues to control the second operating direction of the blind, namely the rolling up direction. The blind remains rolled up.

As soon as the program 23 determines that the first delay period T1 is terminated, the program 25 is implemented in order to control the first operating direction of the blind, which unrolls.

If, before the first delay period T1 is completely elapsed, the intensity of the sun's brightness once more becomes less than the predetermined threshold, the program 20 tests this situation and implements program 24 and 24b which test that the first delay period T1 is not terminated and that the second delay period T2 was not in progress previously. Program 33 and 31 are then implemented, the indicator 9 thus being extinguished and the second operating direction continuing to be controlled. The blind remains rolled up.

When, after the blind has been controlled in its first operating direction and thus unrolled, the intensity of the sun's brightness once more becomes less than the predetermined threshold, the program 20 tests this situation, then the program 24 tests that the first delay period T1 is terminated and the porgrams 27 and 28 are implemented sequentially, the second delay period T2, provided to last ten minutes for example, being initialized and then counted down.

As long as the porgram 28 tests that the second delay period T2 is not terminated, programmes 29, 30, 32 are implemented sequentially, the blind being controlled in order to be actuated in its first direction, namely unrolling and thus remaining unrolled, the binary value of the position recorded in the RAM memory of the microprocessor 5 changing value alternately at a certain frequency and transferring this binary value to the luminous indicator 9 which thus begins to flash. This indicator 9 thus flashes from the beginning of the second delay period T2 in order to indicate that the control device is operating correctly and that the blind will soon be controlled in its second direction.

As soon as the program 28 tests that the second delay period T2 is terminated, the programmes 33, 31 are inplemented sequentially, the luminous indicator 9 being extinguished and the blind being controlled in order to operate in its second direction, namely rolling up. The blind rolls up.

If, before the second delay period T2 elapses completely, the intensity of the sun's brightness once more becomes equal to or greater than the predetermined threshold, the program 20 tests this situation and the programs 21, 22, 23 are implemented sequentially, the luminous indicator 9 being illuminated, the first delay period T1 once more being initialized and then counted down.

As long as the program 23 tests that the first delay period T1 is not terminated, the prgram 35 tests that the second delay period T2 was previously in progress, than the program 25 continues to control the operation of the blind in its first direction, namely unrolling. The blind remains unrolled.

As soon as the program 23 tests that the first delay period T1 is terminated, the program 25 is implemented, the operation of the blind continuing to be controlled in the first direction, namely unrolling. The blind remains unrolled. The linking of the programs 20, 21, 22, 23, 25 makes it possible to initialize again the second delay period T2 at the time when the intensity of the sun's brightness subsequently becomes less than the predetermined threshold.

If the first delay period T1 is interrpted before reaching its end, by the fact that the luminous intensity again becomes less than the predetermined threshold, the program 20 tests this situation, the program 24 tests that the first delay period T1 is not terminated and the program 24b tests that the second delay period was previously in progress. The programs 27, 28, 29, 30 and 32 are implemented sequentially as mentioned previously. The first operating direction of the blind continues to be controlled and the indicator 9 changes from the premanently illuminated position to the flashing position. This state of affairs lasts until the programs 28 tests that the second delay period T2 is terminated.

In the second embodiment, illustrated in FIG. 3, the microprocessor 5 is not present. It is replaced by two logic delay circuits CLT1 and CLT2, by means for controlling the frist and second operating directions of the blind, constituted respectively by a non-inverting gate 10 and by an inverting gate 11, by an electronic oscillator 12 and by a logic circuit 13 for controlling the flashing of the luminous indicator 9.

The logic delay circuit CLT1 comprises an initiating input terminal T3 and an input terminal R3 for resetting to zero, both connected to the output terminal S2 of the electronic comparator 3 and an output terminal S3 connected to the initiating input terminal T4 of the logic delay circuit CLT 2. The output terminal S4 of this circuit CLT2 is connected to the one hand to the output interface 6, through the intermediary of the non-inverting gate 10, on the other hand to the output interface 7, through the intermediary of the inverting gate 11.

The logic circuit CLT1 is constituted for example by a monostable electronic circuit 14 (such as NE555 of SIGNETICS) whereof the terminal R for resetting to zero is connected to the terminal R3 and whereof the initiating input terminal T is connected to the output of an inverting gate 15 whereof the input is connected to the terminal T3. The output terminal S of this monostable electronic circuit 14 is connected to the inverting input of an "AND" gate 16 whereof the second non-inverting input is connected to the terminal T3. the output of this "AND" gate 16 is connected to the output terminal S3. The terminal RC of the monostable circuit 14 is connected to a resistor/capacitor system R1–C1 which in known manner determines the period of this monostable circuit, hence the duration of the first delay period T1.

The logic circuit CLT2 is constituted for example by a monostable electronic circuit 18 (such as NE555 of SIGNETICS) whereof the initiating input terminal T is connected to the output of an inverting gate 17 and to the base of a PNP transistor 19 whereof the collector is connected to earth. The input of this gate 17 is connected to the input terminal T4. The output terminal S of the circuit 18 is connected to the output terminal S4. The terminal RC of the monostable electronic circuit 18 is connected to a resistor/capacitor system R2–C2 and to the emiter of the transistor 19. The system R2–C2 thus determines the period of this monostable circuit, hence the duration of the second delay period T2.

The logic control circuit 13 is constituted for example by an "AND" gate 20 and by a "OR" gate 21. The "AND" gate 20 has a first input terminal E2 connected to the terminal S4, a second input terminal E3 connected to the output S6 of the oscillator 12 and its output connected to the first input terminal of the "OR" gate 21 whereof the second is connected to an input terminal E4 itself connected to the output S2 of the electronic comparator 3. The output S5 of this "OR" gate 21 is connected to the luminous indicator 9 through the intermediary of the interface 8.

The electronic oscillator 12 is constituted for example by an astable multivibrator whereof the terminal RC3 is connected to a resistor/capacitor system R3–C3 which is known manner determines the period of this astable multivibrator and consequently the flashing frequency of the indicator 9.

All the other constituent members are identical to those of the first embodiment described previously (FIG. 1).

Let us assume that the initial position of the blind is the same as that chosen to describe the operation of the first embodiment (FIGS. 1 and 2).

As soon as the intensity of the sun's brightness exceeds the predetermined threshold, the output S2 of the electronic comparator 3 passes to the logic state 1, which causes the output S5 of the logic control circuit 13 to pass to the state 1, which has the effect of illuminating the luminous indicator 9, through the intermediary of the interface 8.

At the same time, as soon as the output S2 of the electronic comparator 3 passes to the logic state 1, the terminals R and T of the monostable circuit 14 pass respectively to 1 and 0, which has the effect of causing the output S of the same circuit 14 to pass to 1 and initiating the beginning of the first delay period T1. The output S3 and S4 of the logic delay circuits respectively CLT1 and CLT2 thus remain at 0 as long as the delay period T1 determined by the system R1–C1 is not terminated.

As soon as this period T1 is terminated, the output S of the monostable circuit 14 passes to the state 0, which has the effect of causing the output S3 to pass to the state 1 and of controlling the first operating direction of the blind through the intermediary of the non-inverting gate 10. In fact, at the same time that the terminal S3 passes to the state 1, the input T of the monostable circuit 18 passes to the state 0, thus its output S passes to the state 1, as well as the terminal S4. Since the output of the inverting gate 17 is at the state 0, it controls the transisitor 19 in the passing state, this transistor short-circuiting the capacitor C2 and preventing it from charging, the second delay period T2 thus not being able to elapse. The blind thus unrolls.

If the intensity of the sun's brightness becomes less than the predetermined threshold, before the end of the elapse of the first delay period T1, the output S2 of the electronic comparator 3 passes to the logic state 0 and since the output S4 of the logic delay circuit CLT2 is itself equal to 0, the output S5 passed to 0, which has the effect of extinguishing the luminous indicator 9.

At the same time, as soon as the output S2 passes to the state 0, the terminals R and T of the monostable circuit 14 pass respectively to the states 0 and 1, which has the effect of causing the output S of the circuit 14 to pass from state 1 to state 0, thus of stopping then cancelling charging of the capacitor C1 and thus of interrupting the first delay period T1. The output S3 thus rests at 0. The blind is not controlled. It remains rolled up.

When, after the end of the elapse of the first delay period T1, the intensity of the sun's brightness becomes less than the predetermined threshold, the output S3 of the logic delay circuit CLT1 changes to state 0 and the input T of the monostable circuit 18 is thus at state 1, which has the effect of causing the transistor 19 to pass to the blocked state and thus to allow charging of the capacitor C2. The second delay period T2 may thus elapse during the period determined by the system R2–C2.

At the same time, the output S of the monostable circuit 18 remains at state 1, thus also the output S4 and the input E2 of the control circuit 13. Since the output S2 is at state 0, the input terminal E4 of the control circuit 13 is at state 0. The state of its output S5 thus depends solely on the state of the input terminal E3 connected to the output S6 of the oscillator 12. Thus, the indicator 9 is successively illuminated then extinguished depending on the state of the output S6 and the indicator 9 flashes at the frequency determined by the system R3–C3.

As soon as the second delay period T2 is terminated, the output S of the monostable circuit 18 passes to the state 0, thus also the output S4, which has the effect on the one hand of controlling the second operating direction of the blind, through the intermediary of the inverting gate 11, on the other hand of causing the input E2 of the control circuit 13 to pass to state 0. The blind rolls up.

At the same time, the input terminal E4 is also at state 0 since the output S2 is at 0, thus the output S5 of the control circuit 13 passes to state 0, whatever the state of the output S6 of hte oscillator 12 and the indicator 9 is extinguished.

If the intensity of the meteorological phenomenon becomes equal to or greater than the predetermined threshold, before the end of the elapse of the second delay period T2, the terminal S2, thus the terminal T3, pass to the state 1 and a new delay period T1 begins. The terminal S of the monostable circuit 14 passes to state 1, the output S3 remaining at state 0, as long as the new delay period T1 is not terminated. the input T4 remains at state 0 and the output S4 remains at state 1.

At the same time, since the input E4 is at state 1, the output S5 controls the permanent illumination of the indicator 9, which replaces the flashing.

If the intensity of the meteoroloical phenomenon remains equal to or greater than the predetermined threshold, for a period greater than the first delay period T1, the output S of the monostable circuit 14 passes to the state 0, thus the output S3 passes to state 1. Consequently, the input T of the monostable circuit 18 is brought to state 0 and the transistor 19 is controlled in the passing state, which has the effect of short-circuiting the capacitor C2 and cancelling its charge, thus of subsequently allowing the elapse of a second complete delay period T2. At this instant, the blind continues to be controlled in its first unrolling direction and the indicator 9 continues to be illuminated. This situation lasts throughout the time when the intensity remains greater than the predetermined threshold. Consequently, as soon as this intensity becomes less than the threshold, a new delay period T2 begins to elapse.

Without diverging from the scope of the present invention, in the two embodiments described, when the second delay period T2 is interrupted subsequent to the intensity of the sun's brightness exceeding the predetermined threshold, without waiting for the end of a new delay period T1, it would be possible to recommence a new complete second delay period T2, as soon as the intensity drops below the predetermined threshold.

What is claimed is:

1. An automatic device for controlling a device for protection against meteorological phenomenon, such as a blind, comprising:
   a sensor for measuring said meteorological phenomenon and generating a sensor signal responsive to the intensity of said phenomenon;
   threshold regulating means for generating a presetable threshold signal;
   a comparator coupled to said sensor and said threshold generating means for generating a comparator signal when said sensor signal exceeds said threshold signal, said comparator signal having a leading end corresponding to a first instance when said sensor signal exceeds said threshold signal and a trailing end corresponding to a second instance when said threshold signal exceeds said sensor signal;
   an illuminating means for indicating a status of said device;
   control means for activating said device in one of a first and a second direction, said control means including a first delay means for activating said device at the end of a first period after said leading end; and a second delay means for activating said device in a second direction at the end of a second period after said trailing end; and
   illuminating control means for activating said illuminating means at the end of said first period if the trailing end does not occur before the end of said first period; said illuminating control means further being provided for activating said illuminating means intermittently during said second period if the illuminating means has been continuously activated; and for deactivating said illuminating means at the end of said second period.

2. The automatic device of claim 1 wherein said control means includes a microprocessor with a ROM, said ROM containing a sequence of programs including:
   a first program for testing whether said sensor signal exceeds said threshold signal;
   a second program for determining the end of said first period;
   a third program for determining the end of said second period; and
   a subroutine for flashing said illuminating means during said second period.

3. The automatic device of claim 1 wherein said first and second delay means include first and second electronic delay circuits respectively, said second delay circuit being activated only if said rear edge occurs after the end of said first period; and said illuminating control means includes a logic control circuit having a first input connected to an output of said comparator, a second input connected to an output of said second delay circuit and a third input connected to a flash generator generating pulses having a predetermined frequency, and an output connected to said illuminating means.

* * * * *